United States Patent

Kouru

Patent Number: 5,089,706
Date of Patent: Feb. 18, 1992

[54] METHOD AND APPARATUS FOR PRODUCING A QUENCH CALIBRATION FUNCTION FOR A LIQUID SCINTILLATION COUNTER

[75] Inventor: Heikki Kouru, Raisio, Finland
[73] Assignee: Wallac Oy, Turku, Finland
[21] Appl. No.: 659,378
[22] PCT Filed: Aug. 29, 1989
[86] PCT No.: PCT/FI89/00160
§ 371 Date: Mar. 4, 1991
§ 102(e) Date: Mar. 4, 1991
[87] PCT Pub. No.: WO90/02959
PCT Pub. Date: Mar. 22, 1990

[30] Foreign Application Priority Data
Sep. 6, 1988 [SE] Sweden .................. 8803114

[51] Int. Cl.⁵ .................................. G01T 1/204
[52] U.S. Cl. ........................ 250/362; 250/328; 250/252.1
[58] Field of Search .......... 250/362, 364, 363.01, 250/328, 252.1

[56] References Cited
U.S. PATENT DOCUMENTS

| | | | |
|---|---|---|---|
| 4,029,401 | 6/1977 | Nather | 250/328 |
| 4,085,325 | 4/1978 | Atallah et al. | 250/328 |
| 4,418,281 | 11/1983 | Horrocks | 250/328 |
| 4,427,887 | 1/1984 | Berthold | 250/328 |
| 4,918,310 | 4/1990 | Rundt et al. | 250/362 |

*Primary Examiner*—Janice A. Howell
*Assistant Examiner*—Richard Hanig
*Attorney, Agent, or Firm*—Armstrong, Nikaido, Marmelstein, Kubovcik & Murray

[57] ABSTRACT

To produce a quench calibration function for a liquid scintillation counter having stored a basic correlation between a quantity to be quench calibrated and a quench index, the value of the quantity to be quench calibrated and the value of the quench index for at least one reference sample is measured by measuring means from said basic correlation, the value of the quantity to be quench calibrated for the measured value of the quench index for each reference sample is evaluated by evaluating means. Then the difference or ratio between the measured and the calculated values of the quantity to be quench calibrated for each reference sample is calculated by calculating means, whereupon said calculated difference or ratio as a function of quench index is approximated by approximating means, and said basic correlation and said function of quench of quench index are combined into the quench calibration function by combining means.

8 Claims, 4 Drawing Sheets

METHOD AND APPARATUS FOR PRODUCING A QUENCH CALIBRATION FUNCTION FOR A LIQUID SCINTILLATION COUNTER

FIELD OF THE INVENTION

The innovation relates to a method and an apparatus for producing a quench calibration function for a liquid scintillation counter. More specifically, this invention is directed to the calibration of a liquid scintillation counter having stored a basic correlation between a quantity to be quench calibrated and a quench index.

BACKGROUND OF THE INVENTION

Liquid scintillation counting is a generally known and widely used technique for the measurement of low energy beta emitting radionuclides in addition to gamma and alpha emitters. The liquid scintillation counter is utilized to make quantitative measurements of the concentration of one or more radionuclides in a solution capable of producing photons resulting from kinetic interactions of nuclear decay products and molecules in the solution. This concentration is directly proportional to the count rate and the counting efficiency of the radionuclide. The counting efficiency is defined as the count rate divided by the disintegration rate.

Beta radiating isotopes constitute the absolutely largest group of radionuclides measured by liquid scintillation counting, and within this group H-3 and C-14 are the two most commonly used isotopes.

In liquid scintillation counting a sample containing radionuclides is dissolved in a mixture with a typical liquid scintillation cocktail, such as an aromatic solvent containing an organic scintillator. The energy of the radio-active decay excites solvent molecules and the energy of excited states of solvent molecules is transferred to excitations of scintillator molecules, and when these excited scintillator molecules return to their ground states, they emit photons. The light is detected by photomultiplier tubes or other photosensitive devices. Most commercially available counters utilize multiple photomultiplier tubes and coincident counting to minimize the background caused by the dark noise of photomultiplier tubes.

The number of photons produced by a radioactive decay is proportional to the energy with which the decay dissipates in the solution. All photons produced within a coincident interval are considered as a pulse. The sum of the amplitudes of the photons of one pulse is known as the pulse height. The range of the pulse heights is a smooth distribution of energies ranging from some minimum energy to some maximum energy. This distribution is known as the pulse height energy distribution spectrum.

The phenomenon of quenching in liquid scintillation counting decreases the number of produced photons. The reduction in the amount of photons shifts the pulse height energy distribution to the left and decreases the rate of counted pulses or the counting efficiency.

Quenching is a consequence of the introduction of some material into the solution, which absorbs primary radiation of radioactive decay or excitations of molecules or photons.

To relate the disintegration rate of a sample to the count rate it is necessary to determine the quench level and correlate it to the counting efficiency. There are different methods to estimate the quench level of a sample. Most of them rely on the effect of quenching on the position of the pulse height energy distribution with respect to a fixed point on the amplitude scale. One can measure the shift in pulse amplitudes of either the spectrum resulting from the dissolved radionuclide or in that of resulting from Compton electrons scattered by gamma rays originating from a radioactive isotope external to the scintillation solution. This isotope is known as the external standard.

A traditional way to measure the pulse amplitude shift is to divide the pulse amplitude scale into two parts: a lower and an upper part and calculate the ratio of the counts in the two parts and use this ratio as a measure of the degree of quenching. This quench indicating parameter is known as the channels' ratio.

Other possible quench indicating parameters are for example the end point of a spectrum or the inflection point of a spectrum. Some counters have two quench indicating parameters of which the other measures the color contents of the sample. The term quench index (and the symbol q) is used henceforth to represent a quench indicating parameter or a vector consisting of more than one quench indicating parameter.

The relationship between a quench index and the counting efficiency of a radionuclide is established by measuring reference samples of known activity and expressing the counting efficiency of these samples as a function of the quench index. The whole procedure is called quench calibration and those functions are called quench calibration functions.

Generally a quench calibration of a quantity means the establishing of a correlation between the values of the quench index and the said quantity. A re-calibration means a calibration in the case, where there already exist a calibration. A quench calibration function is a correlation between the quench index and the calibrated quantity.

To produce a quench calibration, which covers a moderate range of quench levels, several standard samples have to be made and measured. The extrapolation of the quench calibration function out of the range, which the standard samples cover, is quite inaccurate and easily results in systematic errors.

Every radionuclide needs its own standardization and also different liquid solutions and even different kind of quenching materials need their own standardizations. Using of a wrong standard curve in calculating an unknown sample leads to erroneous results. Because in every quench calibration typically from six to ten standard samples are needed at present, an arrangement that decreases the number of standard samples per calibration is valuable.

The shapes of quench calibration functions of one radionuclide resemble each other. So if besides the particular reference samples also the shape of the calibration function of some former calibration can be used, more accurate quench calibrations than before can be made with the same number of standard samples.

At present the only way to utilize any old quench calibration data in making a new quench calibration is to add manually the earlier measured reference sample data to the new reference sample data.

SUMMARY OF THE INVENTION

It is an object of the present invention to provide a method and an apparatus capable of producing more precise quench calibration functions with as few as one standard sample.

Another object is to provide system which can control the quality of reference samples and detect erroneous reference samples.

This is accomplished in accordance with one embodiment of the method according to the invention by measuring the value of the quantity to be quench calibrated and the value of the quench index for at least one reference sample, evaluating from said basic correlation the value of the quantity to be quench calibrated for the measured value of the quench index for each reference sample, calculating the difference or ratio between the measured and the calculated values of the quantity to be quench calibrated for each reference sample, approximating said calculated difference or ratio as a function of quench index, and combining said basic correlation and said function of quench index into the quench calibration function.

In accordance with one embodiment of the apparatus according to the invention, this is accomplished by means for measuring the value of the quantity to be quench calibrated and the value of the quench index for at least one reference sample, means for evaluating from said basic correlation the value of the quantity to be quench calibrated for the measured value of the quench index for each reference sample, means for calculating the difference or ratio between the measured and the calculated values of the quantity to be quench calibrated for each reference sample, means for approximating said calculated difference or ratio as a function of quench index, and means for combining said basic correlation and said function of quench index into the quench calibration function.

This is accomplished in accordance with one embodiment of the method according to the invention by measuring the value of the quantity to be quench calibrated and the value of the quench index for at least one reference sample, evaluating from said basic correlation the value of the quench index corresponding to the measured value of the quantity to be calibrated calculating the difference or ratio between the measured and the calculated values of the quench index for each reference sample, approximating said calculated difference or ratio as a function of quench index, and combining said basic correlation and said function of quench index into the quench calibration function.

In accordance with one embodiment of the apparatus according to the invention, this is accomplished by means for measuring the value of the quantity to be quench calibrated and the value of the quench index for at least one reference sample, evaluating from said basic correlation the value of the quench index corresponding to the measured value of the quantity to be calibrated means for calculating the difference or ratio between the measured and the calculated values of the quench index for each reference sample, means for approximating said calculated difference or ratio as a function of quench index, and means for combining said basic correlation and said function of quench index into the quench calibration function.

This is accomplished in accordance with one embodiment of the method according to the invention by measuring the value of the quantity to be quench calibrated and the value of the quench index for at least one reference sample, modifying the basic correlation by a correction term with at least one undetermined parameter.

determining the undetermined parameter by approximating the measured values of the quantity to be quench calibrated with the values of said quantity evaluated from the modified basic correlation for the measured value of the quench index inserting the value of the undetermined parameter into the modified basic correlation to get the quench calibration function.

In accordance with one embodiment of the apparatus according to the invention, this is accomplished by means for measuring the value of the quantity to be quench calibrated and the value of the quench index for at least one reference sample, means for modifying the basic correlation by a correction term with at least one undetermined parameter.

means for determining the undetermined parameter by approximating the measured values of the quantity to be quench calibrated with the values of said quantity evaluated from the modified basic correlation for the measured value of the quench index means for inserting the value of the undetermined parameter into the modified basic correlation to get the quench calibration function.

This is accomplished in accordance with one embodiment of the method according to the invention by measuring the value of the quantity to be quench calibrated and the value of the quench index for at least one reference sample, modifying the basic correlation by a correction term with at least one undetermined parameter.

determining the undetermined parameter by approximating the measured values of the quench index with the values of the quench index evaluated from the modified basic correlation corresponding to the measured value of the quantity to be calibrated inserting the value of the undetermined parameter into the modified basic correlation to get the quench calibration function.

In accordance with one embodiment of the apparatus according to the invention, this is accomplished by means for measuring the value of the quantity to be quench calibrated and the value of the quench index for at least one reference sample, means for modifying the basic correlation by a correction term with at least one undetermined parameter.

means for determining the undetermined parameter by approximating the measured values of the quench index with the values of the quench index evaluated from the modified basic correlation corresponding to the measured value of the quantity to be calibrated means for inserting the value of the undetermined parameter into the modified basic correlation to get the quench calibration function.

BRIEF DESCRIPTION OF THE DRAWINGS

The invention will be described more in detail below with reference to the attached drawings, on which

DETAILED DESCRIPTION OF THE INVENTION

The invention will be described herein specifically directed to efficiency quench calibration. It is to be understood that the efficiency may be substituted by any other quantity, which is used to describe the behavior of some character of a radionuclide as a function of quenching in the quench calibration of the liquid scintillation counter, for example the mean pulse height of the pulse height energy distribution, which can be used in dual label counting, or the end point of the pulse height energy distribution, which can be used as a quality monitor.

Independent of the liquid scintillation cocktail or quenching material different quench calibration functions of one and the same radionuclide or the one, which energy is about the same, resemble each other a lot, the main features or the shapes of the curves being the same.

The present calibration method is based on utilizing some earlier done quench calibration, which is called the basic correlation between a quantity to be quench calibrated and a quench index.

Figure 1:
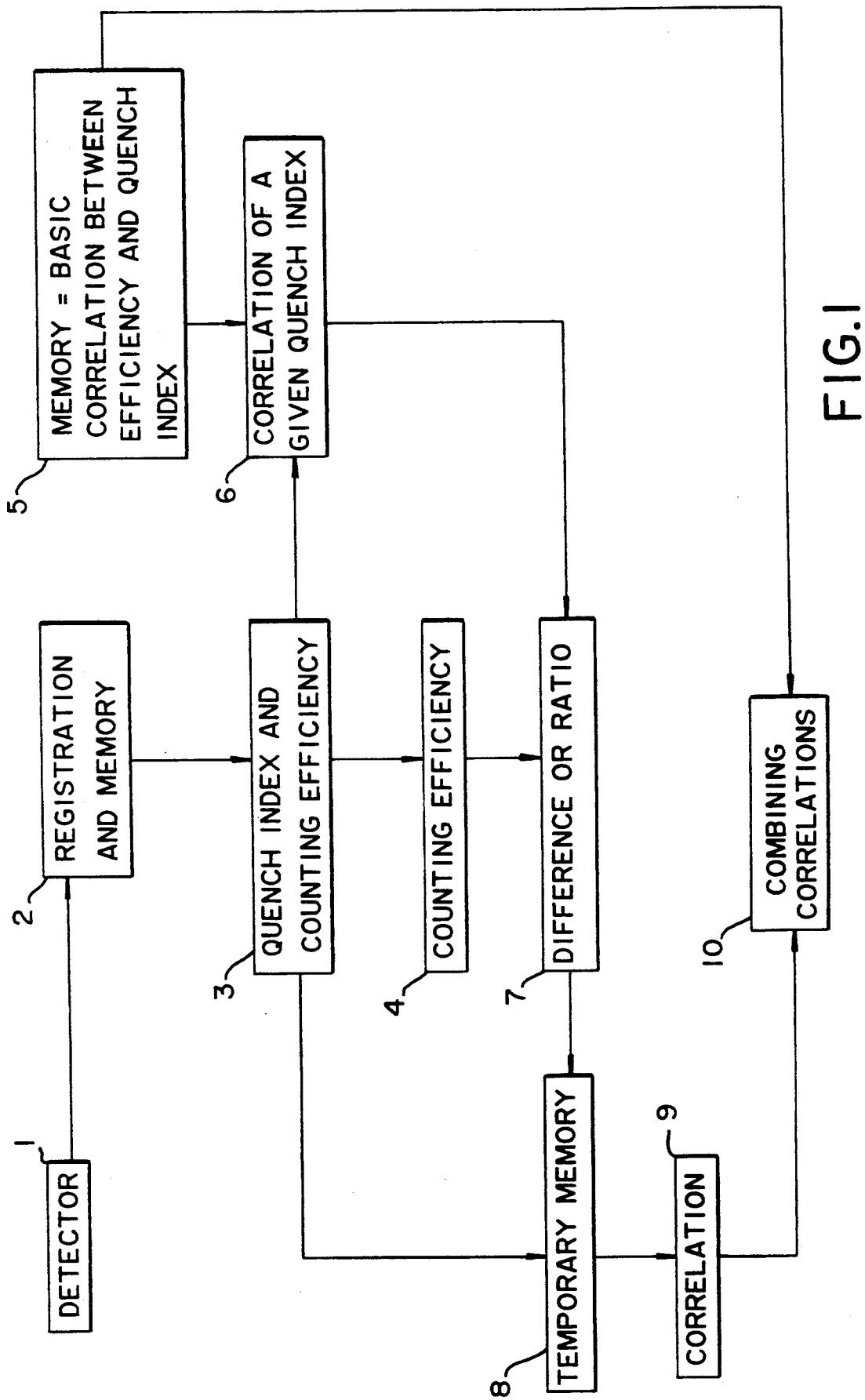
FIGS. 1–4 show schematic block diagrams of four different embodiments of the apparatus according to the invention.

The efficiency quench calibration according to a first embodiment of the invention comprises the following:

An embodiment of an apparatus for carrying this method into effect is shown in FIG. 1. This apparatus comprises a detector unit ref. no. 1, a registration and memory unit ref. no. 2, a device for calculating the quench index and the counting frequency ref. no. 3, a device for calculating the counting efficiency ref. no. 4, a memory unit for storing the basic correlation between the efficiency and the quench index ref. no. 5, a device for evaluating the value of the said correlation at a given quench index value ref. no. 6, a device for calculating difference or ratio ref. no. 7, a memory unit ref. no. 8 for temporarily storing the table, which consists of the quench index and the said difference or ratio pairs, a device for establishing a correlation using the said table ref. no. 9 and a device ref. no. 10 for combining the two correlations as the efficiency quench calibration function.

The detector unit ref. no. 1 usually consists of at least one photomultiplier tube or some other light sensitive device, by which the photons from the liquid scintillation sample are detected.

The unit ref. no. 2 consists usually of a pulse height analyzer and a multichannel analyzer, which records the pulse height distribution from the detector unit.

The unit ref. no. 3 is a computation unit, which calculates the counting frequency and the quench index q of the sample from the said pulse height distribution.

The unit ref. no. 4 is a computation unit, which calculates the measured counting efficiency $e_m$ of the reference sample from the said counting frequency and the activity of the reference sample, which is the input data of this unit.

In the memory unit ref. no. 5 the basic efficiency quench correlation is stored in the form of a table or as the coefficients of a function. If the correlation is in the form of a coefficients, then there is also stored the function itself, for example a polynom and its coefficients. If the said efficiency quench correlation is in the form of a table, the table consists of quench index efficiency pairs and also the instruction, how to evaluate from the table data the efficiency value for a quench index value, for example by a linear interpolation or by some other interpolation technique or by the linear least squares technique or by some other approximation technique. So the unit ref. no. 5 includes an efficiency quench function E, which gives efficiency e as a function of a quench index q: $e = E(q)$.

The unit ref. no. 6 is a computation unit, which is able to evaluate the efficiency $e_o$ value for the measured quench index value by the instructions given in the unit ref. no. 5.

The unit ref. no. 7 is a computation unit, where the difference or the ratio of the evaluated efficiency $e_o$ and the measured efficiency $e_m$ can be calculated. This expression is noted by d. Here is a few examples of the expression d:

$$d = e_o - e_m \tag{1}$$

$$d = e_m - e_o \tag{2}$$

$$d = e_o - e_m + a \tag{3}$$

$$d = \frac{1}{e_m - e_o + a} \tag{4}$$

$$d = \cos(e_m - e_o) \tag{5}$$

$$d = f(e_m - e_o) \tag{6}$$

$$d = f(e_o) - g(e_m) \tag{7}$$

$$d = \frac{e_o - e_m}{e_m} \tag{8}$$

$$d = \frac{e_o}{e_o - e_m + a} \tag{9}$$

$$d = \frac{e_m - e_o}{(e_m + e_o)/2} \tag{10}$$

$$d = \frac{e_o - e_m + a}{e_o + b} \tag{11}$$

$$d = f\left(\frac{e_o - e_m}{e_m}\right) \tag{12}$$

$$d = \frac{e_o}{e_m} \tag{13}$$

$$d = \frac{e_m + }{e_o + b} \tag{14}$$

$$d = \frac{f(e_m)}{g(e_o)} \tag{15}$$

$$d = \frac{f(e_m) - g(e_o)}{h(e_m) + k(e_o)} \tag{16}$$

where a and b are constants and f, g, h and k are functions for example polynoms or trigonometric functions.

The examples 1, 2, 3, 4 and 5 are expressions, which include the absolute difference and the examples 6 and 7 are generalizations.

The examples 8, 9, 10 and 11 are expressions, which include the relative difference and the example 12 is a generalization.

The examples 13 and 14 are expressions, which include the ratio and the example 15 are generalizations.

Generally the expression of the difference or the ratio is a function of measured efficiency $e_m$ and evaluated efficiency $e_o$ and the function is noted $d = D(e_m, e_o)$.

The kind of modification of the expression d is used, which behaves most smoothly and the behavior of which is easy to approximate.

The unit ref. no. 8 is a memory unit for temporarily storing the measured quench index value the reference samples and the values of the said difference or the said ratio d of the reference samples.

The unit ref. no. 9 is a computation unit, where the correlation is established between the said difference or the said ratio d and the measured quench index $q_m$, which are store in the unit ref. no. 8. In this difference correlation the difference or the ratio d is expressed as a function of the said quench index: $d = B(q_m)$. The correlation B can be established by some commonly known interpolation or approximation technique.

The unit ref. no. 10 is a computation unit, where the two said correlations B and E are combined to one efficiency quench function. The combination of the correlations is done through the expression $d = D(e_m, e_o)$. So the efficiency quench function or correlation between q and $e_m$ is defined implicitly by tree simultaneous equations $$d = D(e_m, e_o)$$

$$d = B(q_m)$$

$$e_o = E(q_m).$$

The correlation can be reduced to one equation by substituting d and $e_o$ in the first equation:

$$B(q_m) = D[e_m, E(q_m)].$$

The above equation defines a correlation between the quench index $q_m$ and the real counting efficiency $e_m$. This correlation is called the combined efficiency quench function. It is not always possible to express the combined efficiency quench function explicitly and an implicit expression have to be used and the solving of the implicit expression have to be done by some common numerical equation solving algorithm.

One simple example to demonstrate this system further. Let the basic quench correlation be of the form $$e = E(q) = 0.001 \cdot q$$

and the expression of difference be $$d = D(e_m, e_o) = e_o - e_m.$$

In the table I there are the results of two reference samples. In table I following symbols are used: $q_m$ is the quench index of a reference sample, $e_m$ is the measured efficiency, $e_o$ is the efficiency evaluated from the basic quench correlation and d is the difference.

TABLE I

| $q_m$ | $e_m$ | $e_o$ | d |
|---|---|---|---|
| 800 | 0.80 | 0.70 | −0.10 |
| 400 | 0.40 | 0.35 | −0.05 |

Let use linear interpolation to approximate the correlation B between $q_m$ and d. So one get $$d = B(q_m) = (800 - q_m) \cdot \frac{(-0.10 + 0.05)}{(800 - 400)} - 0.10$$

$$= (800 - q_m) \cdot (-0.000125) - 0.10$$

Now the efficiency of an unknown sample, whose quench index is 600, can be calculated as follows. First from the basic correlation E value $e_o = 0.60$ is calculated and then from the difference correlation B value $d = 0.075$ is calculated. Then the efficiency $e_m$ is calculated from the expression $d = D(e_m, e_o)$ $$0.075 = 0.60 - e_m$$

and so the efficiency value $e_m$ is 0.525.

It is obvious that by this method it is possible to make a efficiency quench function by measuring only one sample. Then the function B(q) will be constant over q and so the deviation of the efficiency from the value given by the basic quench correlation model is constant in the whole quenching level range.

With the present method erroneous reference samples can be identified by extraordinary high or illogical deviations from the basic correlation curve.

Figure 2:
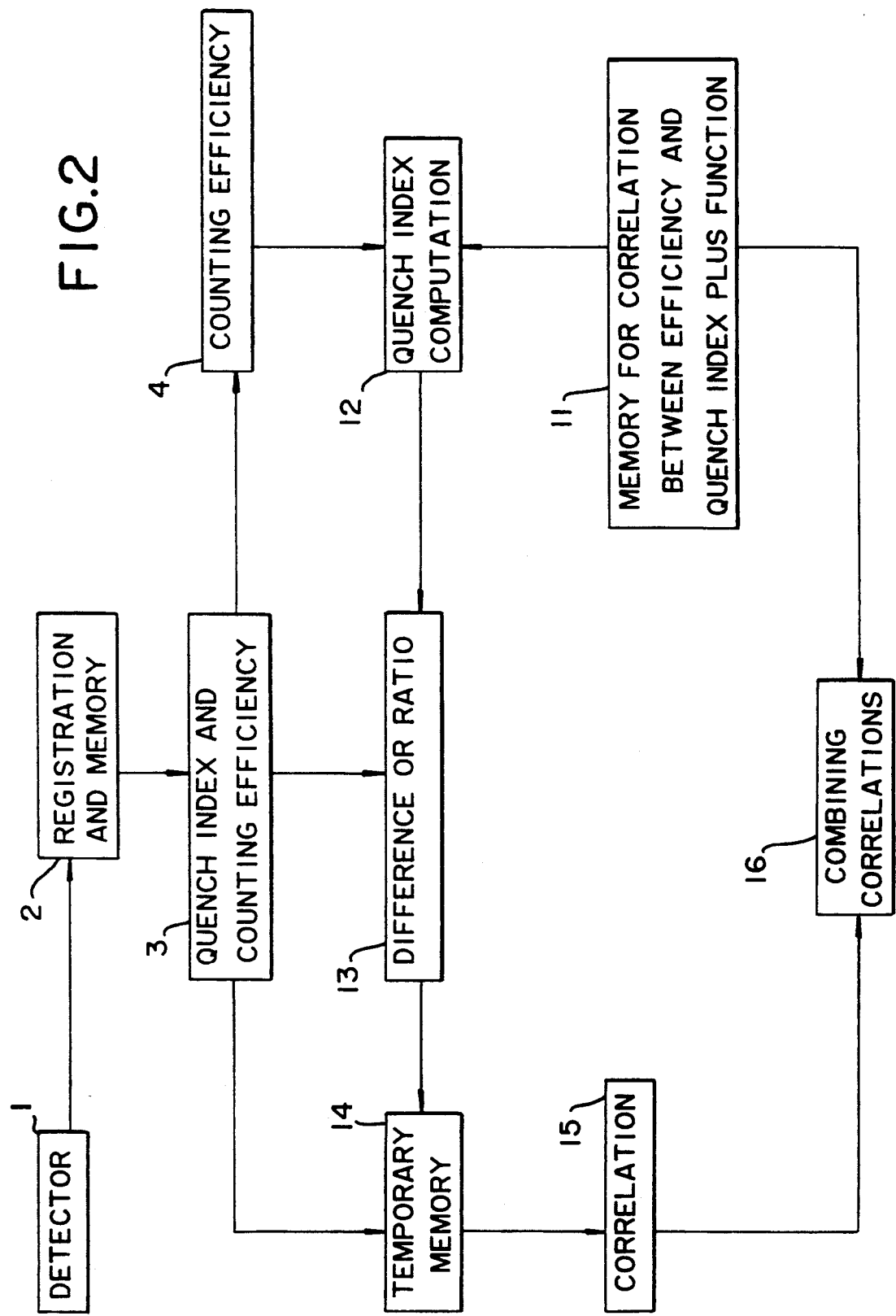

The efficiency quench calibration according to a second embodiment of the invention comprises the following:

An embodiment of an apparatus for carrying this method into effect is shown in FIG. 2. Blocks in FIG. 2, which are identical to blocks in FIG. 1 carry the same reference numerals. This apparatus comprises a detector unit ref. no. 1, a registration and memory unit ref. no. 2, a device for calculating the quench index and the counting frequency ref. no. 3, a device for calculating the counting efficiency ref. no. 4, a memory unit for storing the basic correlation between the efficiency and the quench index ref. no. 11, a device for evaluating the value of the said inverse function at a given counting efficiency value ref. no. 12, a device for calculating difference or ratio ref. no. 7, a memory unit ref. no. 8 for temporarily storing the table, which consists of the quench index and the said difference or ratio pairs, a device for establishing a correlation using the said table ref. no. 9 and a device ref. no. 10 for combining the two correlations as the efficiency quench calibration function.

The memory unit ref. no. 11 is identical with the unit ref. no. 5 otherwise, but besides the basic efficiency quench correlation $e = E(q)$ there is also stored instructions, how to evaluate the inverse function of the said correlation $q = E - 1(e)$. Symbol Q is used instead of $E - 1$. So unit ref. no. 11 includes function $q = Q(e)$.

The unit ref. no. 12 is a computation unit, which is able to evaluate the quench index value $q_o$ for the measured counting efficiency value $e_m$ by the instructions given in the unit ref. no. 11. The computation unit ref. no. 13 is identical with the unit ref. no. 7 otherwise, but instead of efficiencies there is calculated the difference or the ratio of the evaluated quench index $q_o$ and the measured quench index $q_m$. This expression is noted by d and $d = D(q_m, q_o)$.

The unit ref. no. 14 is a memory unit for temporarily storing the measured quench index value the reference samples and the values of the said difference or the said ratio d of the reference samples.

The unit ref. no. 15 is a computation unit, where the correlation is established between the said difference or the said ratio d and the measured quench index q, which are store in the unit ref. no. 14. In this difference correlation the difference or the ratio d is expressed as a function of the said quench index: $d = B(q)$. The correlation B can be established by some commonly known interpolation or approximation technique.

The unit ref. no. 16 is a computation unit, where the two said correlations B and Q are combined to one efficiency quench function. The combination of the correlations is done through the expression $d = D(q_m,$ $q_o$). So the efficiency quench function or correlation between q and $e_m$ is defined implicitly by tree simultaneous equations $$d = D(q_m, q_o)$$

$$d = B(q_m)$$

$$q_o 32\ Q(e_m).$$

The correlation can be reduced to one equation by substituting d and $q_o$ in the first equation:

$$B(q_m) = D(q_m, Q(e_m)).$$

The above equation defines a correlation between the quench index q and the real counting efficiency $e_m$. This correlation is called the combined efficiency quench function. It is not always possible to express the combined efficiency quench function explicitly and an implicit expression have to be used and the solving of the implicit expression have to be done by some common numerical equation solving algorithm.

Figure 3:
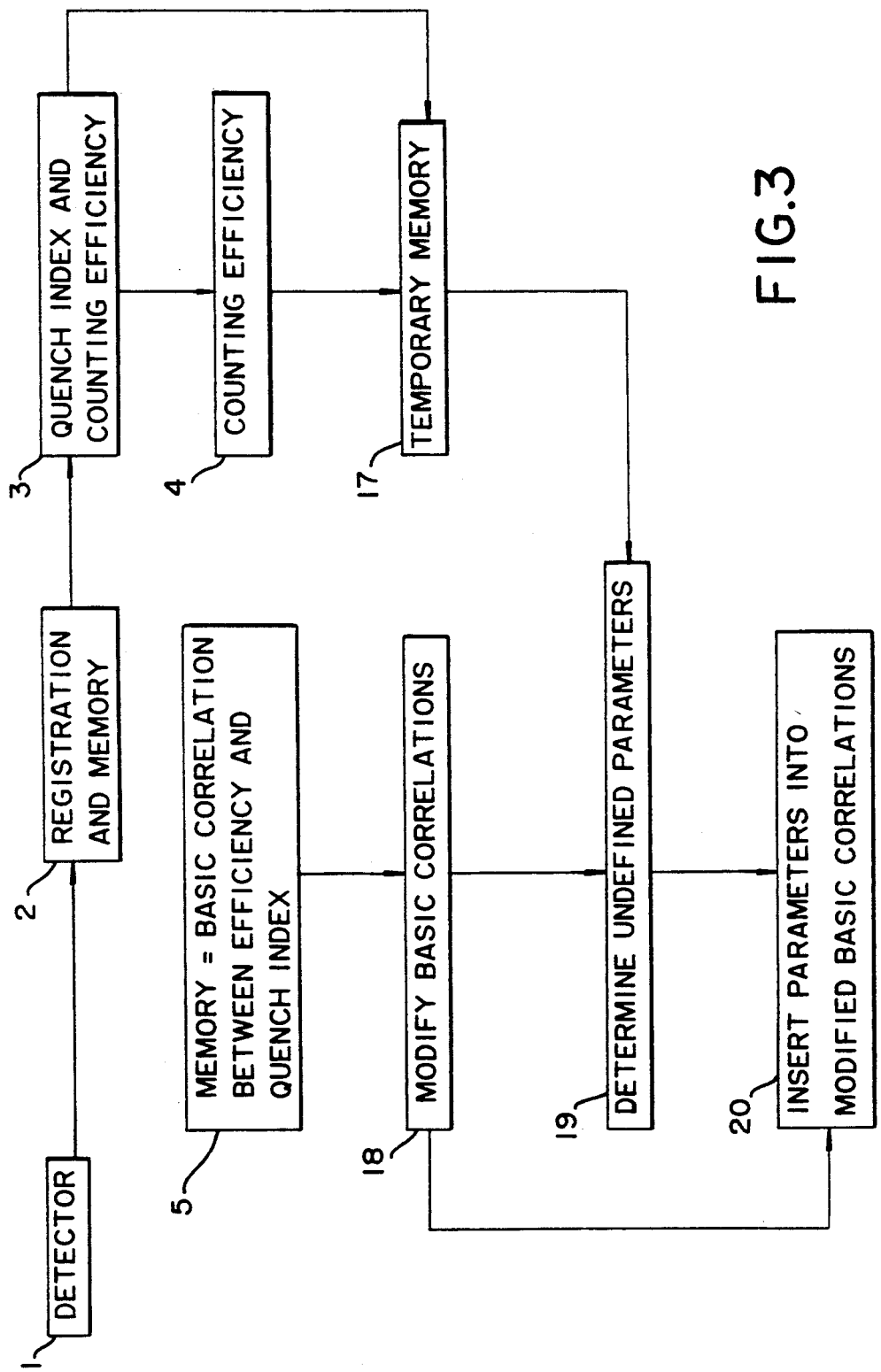

The efficiency quench calibration according to a third embodiment of the invention comprises the following:

An embodiment of an apparatus for carrying this method into effect is shown in FIG. 3. Blocks in FIG. 3, which are identical to blocks in FIG. 1 carry the same reference numerals. This apparatus comprises a detector unit ref. no. 1, a registration and memory unit ref. no. 2, a device for calculating the quench index and the counting frequency ref. no. 3, a device for calculating the counting efficiency ref. no. 4, a memory unit ref. no. 17 for temporarily storing the measured quench indices and the counting efficiencies of the reference samples, a memory unit ref. no. 5 for storing the basic correlation between the efficiency and the quench index, a memory unit ref. no. 18, which includes the instructions to modify the basic correlation by a correction term with at least one undetermined parameter, a device ref. no. 19 to find out those values of the said undetermined parameters, which approximate best the data in unit ref. no. 17, a device ref. no. 20 to form the efficiency quench function by inserting the parameters from unit ref. no. 19 into the modified basic correlation ref. no. 18.

The memory unit 18 includes the modifications of the basic efficiency quench correlation. Let note the basic efficiency quench correlation by E and the modified efficiency quench correlation by M. Here is a few examples of the modification M:

$$e = M(q,a) = E(q) + a$$

$$e = M(q,a) = a^*E(q)$$

$$e = M(q,a,b) = (a + b^*q)E(q)$$

$$e = M(q,a,b) = \sin(a^*q)\ E(q+b).$$

It is characteristics to the modified correlation M that there exist certain values of the undetermined parameters $a_o$, $b_o$ and $C_o$, for which $$M(q,a_o 1, b_o, C_o) = E(q).$$

The unit ref. no. 19 is a computation unit, which can determine the undetermined parameters in the modified correlation M using the quench index and the counting efficiency data of the reference samples. The determination of the parameters is done by some common fitting algorithm for example by the least squares. In least squares fitting the values of the parameters a, b and c are determined so that the sum of the squares of the differences between the efficiencies and the values of the modified efficiency function evaluated at the quench index value of the unit ref. no. 17 is minimized:

$$\min\{\Sigma_i [e_i - M(q_i, a, b, c)]^2\}.$$

The unit ref. no. 20 is a computation unit, which substitutes the undetermined parameters in the modified correlation by their values $a_1$, $b_1$ and $c_1$ determined by the unit ref. no. 19. So the efficiency quench function is $$e = M(q, a_1, b_1, c_1).$$

Figure 4:
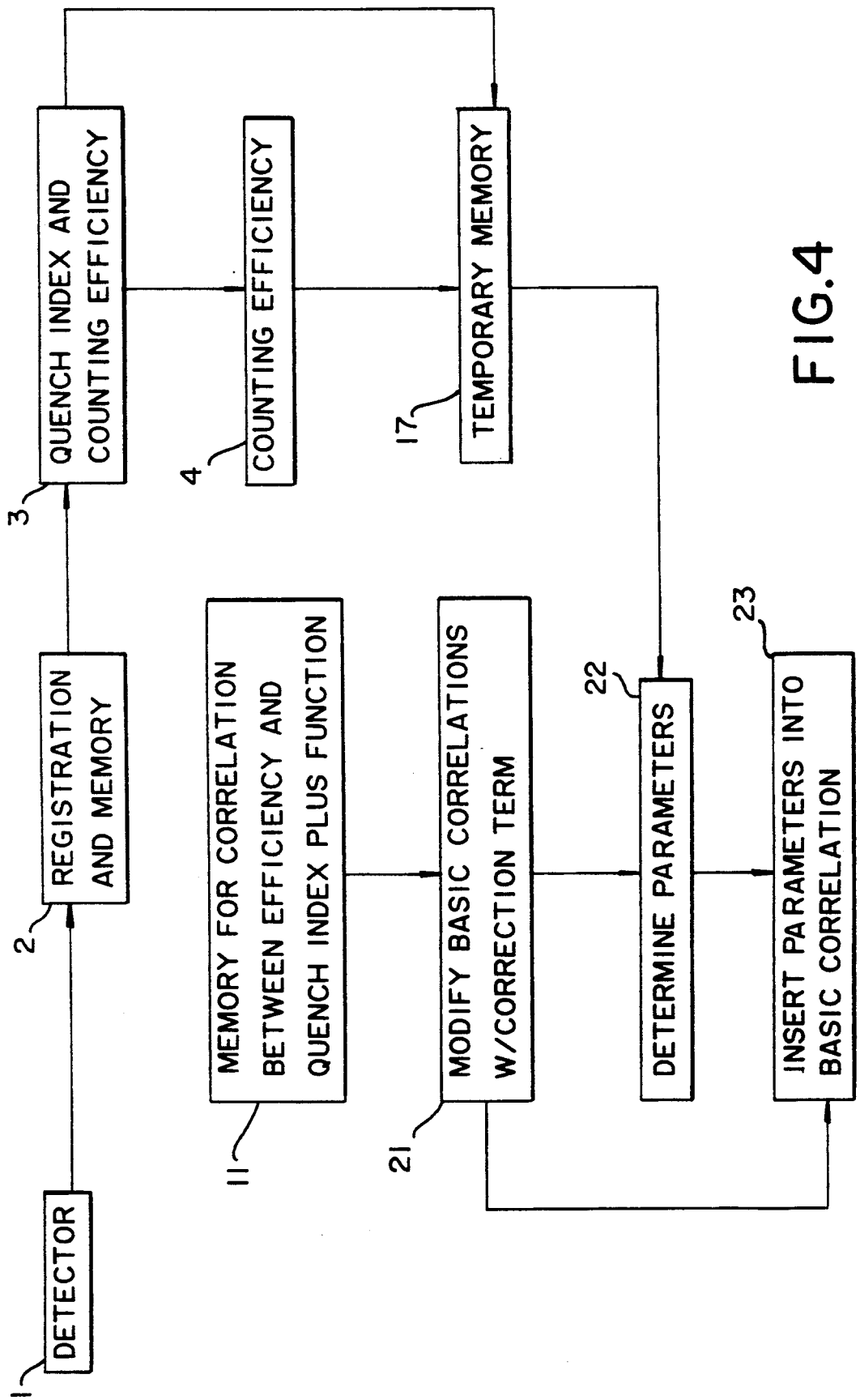

The efficiency quench calibration according to the fourth embodiment of the invention comprises the following:

An embodiment of an apparatus for carrying this method into effect is shown in FIG. 4. Blocks in FIG. 4, which are identical to blocks in FIG. 1, FIG. 2 and FIG. 3 carry the same reference numerals This apparatus comprises a detector unit ref. no. 1, a registration and memory unit ref. no. 2, a device for calculating the quench index and the counting frequency ref. no. 3, a device for calculating the counting efficiency ref. no. 4, a memory unit ref. no. 17 for temporarily storing the measured quench indices and the counting efficiencies of the reference samples, a memory unit for storing the basic correlation between efficiency and the quench index ref. no. 11, a memory unit ref. no. 21, which includes the instructions to modify the basic correlation by a correction term with at least one undetermined parameter, a device ref. no. 22 to find out those values of the said undetermined parameters, which approximate best the data in unit ref. no. 17, a device ref. no. 23 to form the efficiency quench function by inserting the parameters from unit ref. no. 22 into the modified basic correlation ref. no. 21.

The memory unit 21 includes the instructions to the modification of the inverse function Q of the basic correlation, which is stored in the unit ref. no. 11. Otherwise unit 21 is identical with the unit 18 and so it can be noted $$q = M(e,a,b,c).$$

The unit ref. no. 22 is a computation unit and it is identical to the unit ref. no. 18 except for the expression, which is to minimized is $$\min\{\Sigma_i [q_i - M(e_1, a, b, c)]^2\}.$$

The unit ref. no. 23 is a computation unit, which substitutes the undetermined parameters in the modified correlation by their values $a_1$, $b_1$ and $c_1$ determined by the unit ref. no. 19. So the efficiency quench function is determined by the equation $$q = M(e, a_1, b_1, c_1)$$

The advantages of the present method is that the information from the measurement of reference samples is combined with the information of the basic correlation. That is, the basic correlation is corrected or adjusted according to experimental values, so interpolations and extrapolations are more precise. By this method it is possible to decrease the deviations of the calculated quench calibration function from the real function by an order of magnitude compared to a quench calibration, which is made without a basic correlation. The effect is more pronounced in extrapolation. Also erroneous standard samples can be identified by extraordinary high or illogical deviations from the base curve.

One further variation of this method is to make a transformation, which corresponds the basic correlation, either for the parameter to be quench calibrated or for the quench index.

I claim:

1. A method for producing an improved quench calibration function for the liquid scintillation counter with constant gain, said counter having stored a basic quench calibration function, said basic quench calibration function being a correlation between a quantity to be quench calibrated and a quench index, said method being characterized by measuring at least one reference sample, determining for each reference sample, called "a", the value of the quantity to be quench calibrated, called $e_a$, and the value of the quench index, called $q_a$, evaluating for each reference sample a comparison value, called $d_a$, from said basic quench calibration function, said $d_a$ being the value of the quantity to be quench calibrated corresponding to said $q_a$ or the value of the quench index corresponding to said $e_a$, producing said improved quench calibration function by using said each $d_a$.

2. Method of claim 1 wherein said producing of said improved quench calibration function, characterized by calculating the difference or ratio between the measured values $e_a$ or $q_a$ and corresponding said $d_a$ values for each reference sample, approximating said calculated difference or ratio as a function of quench index, which function is called approximating function, and combining said basic quench calibration function and said approximating function into said improved quench calibration function.

3. The method of claim 1 wherein said producing of said improved quench calibration function, characterized by forming a modification of said basic quench calibration function, called modified calibration function, which includes a correction term with at least one undetermined parameter, determining said undetermined parameter by approximating the measured values $e_a$ with the $d_a$ values of said quantity evaluated from said modified calibration function corresponding to $q_a$, inserting the value of said undetermined parameter into said modified calibration function to get said improved quench calibration function.

4. The method of claim 1 wherein said producing of said improved quench calibration function, characterized by forming a modification of said basic quench calibration function, called modified calibration function, which includes a correction term with at least one undetermined parameter, determining said undetermined parameter by approximating the measured values $q_a$ with the $d_a$ values of the quench index evaluated from said modified calibration function corresponding to $e_a$, inserting the value of said undetermined parameter into said modified calibration function to get said improved quench calibration function.

5. An apparatus for producing an improved quench calibration function for the liquid scintillation counter with constant gain, said apparatus having stored a basic quench calibration function, said basic quench calibration function being a correlation between a quantity to be quench calibrated and a quench index, said apparatus being characterized by means for measuring at least one reference sample, means for determining for each reference sample, called "a", the value of the quantity to be quench calibrated, called $e_a$, and the value of the quench index, called $q_a$, means for evaluating for each reference sample a comparison value, called $d_a$, from said basic quench calibration function, said $d_a$ being the value of the quantity to be quench calibrated corresponding to said $q_a$ or the value of the quench index corresponding to said $e_a$, means for producing said improved quench calibration function by using said each $d_a$.

6. Apparatus of claim 5 wherein means for producing said improved quench calibration function, characterized by means for calculating the difference or ratio between the measured values $e_a$ or $q_a$ and corresponding said $d_a$ values for each reference sample, means for approximating said calculated difference or ratio as a function of quench index, which function is called approximating function and means for combining said basic quench calibration function and said approximating function into said improved quench calibration function.

7. Apparatus of claim 5 wherein means for producing said improved quench calibration function, characterized by means for forming a modification of said basic quench calibration function, called modified calibration function, which includes a correction term with at least one undetermined parameter, means for determining said undetermined parameter by approximating the measured values $e_a$ with the $d_a$ values of said quantity evaluated from said modified calibration function corresponding to $q_a$, means for inserting the value of said undetermined parameter into said modified calibration function to get said improved quench calibration function.

8. Apparatus of claim 5 wherein means for producing said improved quench calibration function, characterized by means for forming a modification of said basic quench calibration function, called modified calibration function, which includes a correction term with at least one undetermined parameter, means for determining said undetermined parameter by approximating the measured values $q_a$ with the $d_a$ values of the quench index evaluated from said modified calibration function corresponding to $e_a$, means for inserting the value of said undetermined parameter into said modified calibration function to get said improved quench calibration function.

* * * * *